United States Patent
Ganesh et al.

(10) Patent No.: US 9,288,371 B2
(45) Date of Patent: Mar. 15, 2016

(54) IMAGE CAPTURE DEVICE IN A NETWORKED ENVIRONMENT

(71) Applicant: QUALCOMM Incorporated, San Diego, CA (US)

(72) Inventors: Shriram Ganesh, San Diego, CA (US); Babak Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/709,512

(22) Filed: Dec. 10, 2012

(65) Prior Publication Data

US 2014/0160307 A1 Jun. 12, 2014

(51) Int. Cl.
*H04N 5/225* (2006.01)
*H04N 5/232* (2006.01)

(52) U.S. Cl.
CPC ......... *H04N 5/2256* (2013.01); *H04N 5/23206* (2013.01)

(58) Field of Classification Search
CPC ........................................ H04N 5/235–5/2354
USPC ......... 348/370–371; 396/155–206; 362/3–18, 362/230–233
See application file for complete search history.

(56) References Cited

U.S. PATENT DOCUMENTS

| | | | |
|---|---|---|---|
| 6,548,967 B1 * | 4/2003 | Dowling et al. | 315/318 |
| 7,014,336 B1 * | 3/2006 | Ducharme et al. | 362/231 |
| 8,223,261 B2 | 7/2012 | Lee | |
| 8,600,224 B2 * | 12/2013 | Clark | 396/56 |
| 2004/0052076 A1 * | 3/2004 | Mueller et al. | 362/293 |
| 2005/0140822 A1 * | 6/2005 | Ichikawa | 348/370 |
| 2005/0281549 A1 * | 12/2005 | Shih et al. | 396/57 |
| 2009/0185797 A1 | 7/2009 | Ogasawara | |
| 2009/0271002 A1 | 10/2009 | Asofsky | |
| 2011/0153738 A1 | 6/2011 | Bedingfield | |
| 2012/0096085 A1 | 4/2012 | Yoon et al. | |
| 2012/0099847 A1 | 4/2012 | Clark | |
| 2012/0200660 A1 | 8/2012 | Verthein et al. | |

FOREIGN PATENT DOCUMENTS

| | | |
|---|---|---|
| EP | 1720342 A2 | 11/2006 |
| JP | 2008103925 A | 5/2008 |

OTHER PUBLICATIONS

International Search Report and Written Opinion—PCT/US2013/069124—ISA/EPO—Sep. 25, 2014.

* cited by examiner

*Primary Examiner* — Twyler Haskins
*Assistant Examiner* — Dwight C Tejano
(74) *Attorney, Agent, or Firm* — Knobbe, Martens, Olson & Bear, LLP

(57) ABSTRACT

Described herein are methods and devices that employ wireless network to control the lighting of a target image scene or subject. As described, connected environments enable control of lighting devices within the environment through the use of a network. Some embodiments of the imaging devices described herein may employ the network to control lighting devices for the purpose of illuminating a target scene or subject. Certain embodiments may employ data regarding camera location, subject location, light bulb location, and the parameters of each light bulb in a room to calculate desired lighting parameters for capturing an image of the subject, and may further be able to wirelessly adjust the light bulb parameters to match the calculated parameters.

25 Claims, 5 Drawing Sheets

WIRELESS LIGHT CONTROLLING IMAGE CAPTURE DEVICE

USER SYSTEM OVERVIEW

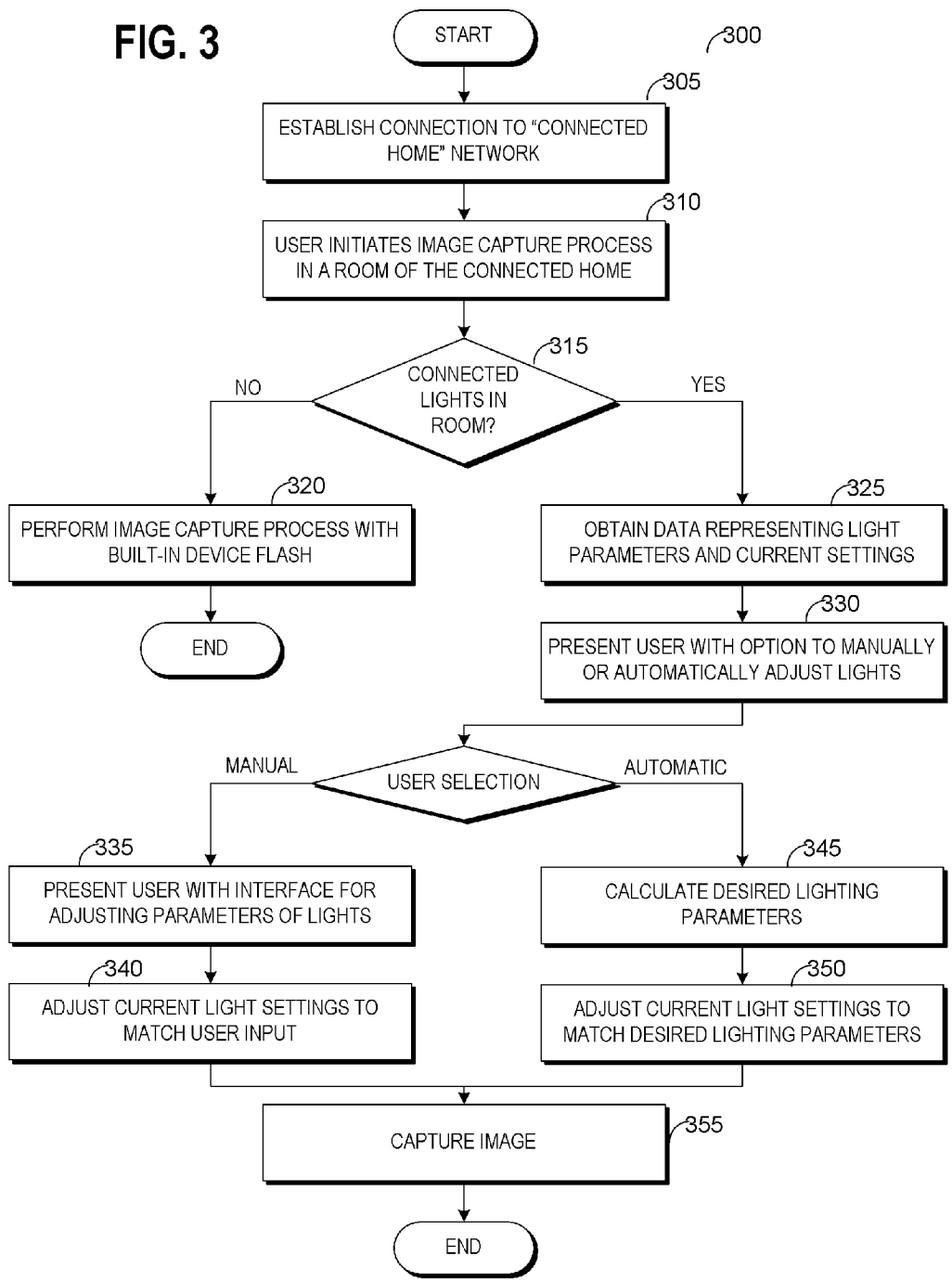

IMAGE CAPTURE DEVICE IN A NETWORKED ENVIRONMENT

TECHNICAL FIELD

The present embodiments relate to imaging devices, and in particular, to methods and apparatus for the use of an image capture device in a networked environment.

BACKGROUND

Digital imaging capabilities have been integrated into a wide range of devices, including digital cameras, tablet computers, and mobile phones. Digital imaging devices or image capture systems can refer to any device that can capture one or more digital images, including devices that capture still images or videos. Such devices commonly employ flash lighting technologies for the purpose of illuminating target image scenes or subjects. Many digital imaging devices have an integral flash built in to the body of the device, and some may be capable of controlling remote flash lighting devices.

The integration of digital processing technology with imaging devices has enabled more powerful and easier to use photographic products, and has enabled devices to capture and enhance image data as well as connect to a network. For example, digital imaging technology may be integrated into a mobile computing device such as a mobile phone, laptop, or tablet computer which also has wireless network connectivity, and digital cameras may also be provided with wireless communication. Existing approaches implement target scene or subject lighting through control of built-in or remote flash lighting devices. Such devices, however, lack the ability to sense and control existing lighting devices in the environment of the target image scene or subject.

SUMMARY

In one embodiment, lights proximate to the location of the camera may be selected to be dimmed or turned off for image capture, and lights proximate to the subject may be selected to be turned on or made brighter based on the auto-focus lens position of the camera. Certain embodiments may use, in calculating the lighting parameters, a key light which is a light close to the subject, preferably in front of the subject and aimed directionally toward the subject, as well as a fill light or plurality of fill lights which may be used to fill in shadows in the background. Some embodiments may not use all the lights in the room and may turn off some lights.

A preview may be displayed to the camera user of the subject with the calculated lighting parameters, and additional previews may be presented for the same subject with alternate lighting parameters. For example, alternate lighting parameters may be professional light with key and fill, mood lighting, full lighting, dim lighting, etc.

The user may select one set of lighting parameters from the preview. The camera may connect to the light bulbs via the integrated wireless network and adjust the parameters according to the user selection. In one embodiment, the lighting is adjusted only temporarily for the duration of image capture, for example as a flash. In another embodiment, the calculated lighting parameters may be sustained for a longer time, such as the duration of video capture. The techniques described herein provide the benefit of conserving camera battery through nonuse of the camera flash, as well as providing more refined subject lighting as compared to a single-point flash.

BRIEF DESCRIPTION OF THE DRAWINGS

FIG. 3 illustrates an image capture environmental lighting control process according to one embodiment.

DETAILED DESCRIPTION

Figure 1:
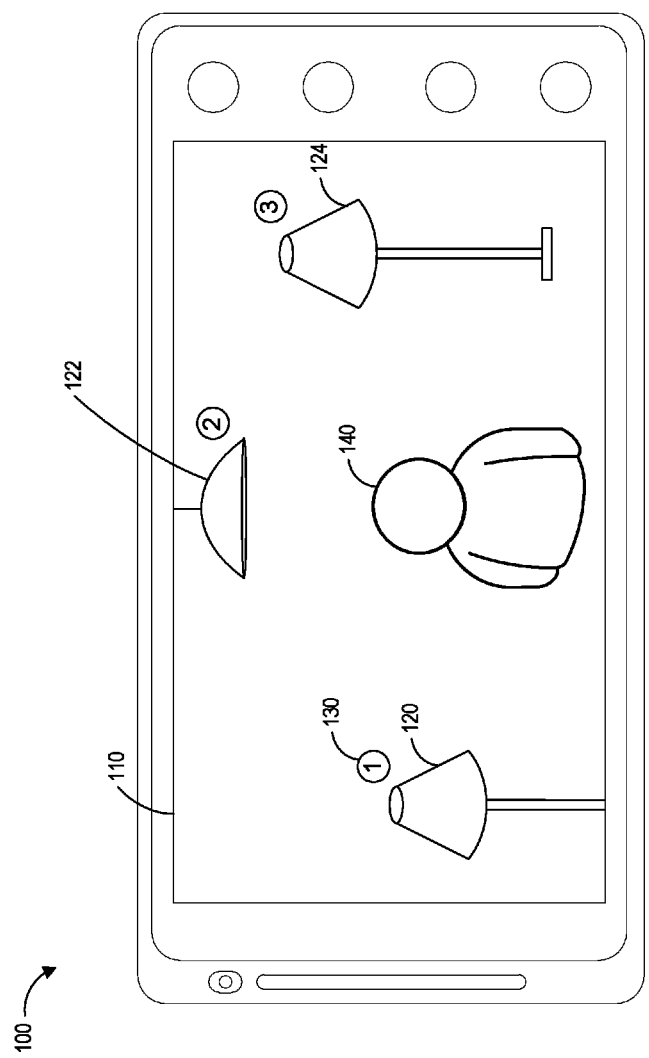
FIG. 1 illustrates an embodiment of an image capture device configured to wirelessly control environmental lighting.

Embodiments of image lighting systems described herein employ a wireless network within an environment to access and control lighting devices already existing in the environment to illuminate a target image scene or subject. For example, when capturing an image in a home or other building, there may be a number of different lights present which create a local lighting environment affecting the photographic subject. Embodiments of digital imaging devices disclosed herein may use a wireless network within the home or building to access a variety of characteristics of the lights near the subject, such as the location and brightness of the lights, and may further use the wireless network to adjust the local lighting environment as desired to capture the image of the subject.

Recent developments in the application of wireless technology have enabled the networking and control of systems and devices within an indoor setting. For example, within a home there may be numerous electrical systems (e.g., light switches, televisions, radios, etc.), mechanical systems (e.g., windows, doors, door locks, etc.), communication systems (e.g., a security system, a local area network (LAN), etc.), and entertainment systems (e.g., televisions, home theater systems, etc.), and a connected home may enable centralized control of all of these systems.

In a connected home, an integrated wireless network, such as the AllJoin™ proximity-based peer-to-peer (P2P) system (Qualcomm Innovation Center, Inc, San Diego, Calif.), connects appliances and devices to an interface which can provide information regarding the appliances and devices to each other and/or a user. This information may be transmitted to a camera or other image capture device as described herein. In some embodiments, the camera may be included in a smart phone device which is used to monitor and control the appliances and devices in the home.

The light bulbs of the home, or of certain rooms within the home, may be capable of wireless connection to the digital imaging device, for instance by using a P2P system. When the digital imaging device enters any connected room, the digital imaging device may connect to the light bulbs inside the room and obtain data regarding a variety of parameters of those connected light bulbs. The light bulbs may transmit data representing these parameters, for example the type of bulb employed, the location of the light source, the direction of the light source, and the brightness and flash capability of the bulb, to the digital imaging device.

When the digital imaging device is focused on a subject to capture an image of the subject, the digital imaging device may calculate lighting parameters that would produce a high-quality image. The camera may include in this calculation data representing the parameters of any light bulbs in the room, such as location, flash capability and brightness capability, and may relate the location of the light bulbs to the location of the digital imaging device and/or the subject. The location of the subject may be determined by a variety of methods, for example by the auto-focus lens position of the digital imaging device to calculate an approximate distance of the subject from the digital imaging device. The direction the camera is facing may also be used to calculate the location of the subject. If the subject moves, the lens in the digital imaging device may track the moving subject and determine new subject location data. The calculated lighting parameters may be dynamically adjusted based on the new location data.

Embodiments of an image capture device in a network environment described herein provide for an image capture device that may be configured to connect to and adjust the settings of illumination devices in order to create better images. The image capture device may contain a built-in flash, but may also be configured to adjust or control any connected lights in order to create optimal lighting settings for a photograph. This may allow the image capture device to create better photographs and also have better battery life, due to decreased use of the flash.

In one embodiment, the image capture device may allow a user to manually control the lights to create optimal lighting settings or may include an automatic mode, where the image capture device may control nearby connected lights in order to create better photographs or videos.

In another embodiment, the image capture device may be able to control lights in order to reduce the amount of glare. In this embodiment, the system would sense which lights were backlighting the subject, or causing glare to form on the image sensor, and then adjust the luminance of that light to reduce the amount of glare.

Another embodiment of the system is an image capture device that reads the type of each light in the room through the wireless network, and then controls the lights based on the type of light. For example, some lights such as florescent lights take longer to turn on than incandescent lights. Thus, the camera communicates with the lights in the room to first determine, based on the position of the subject, that light A will be the key light, light B will be the fill light, and light C will be the backlight. However, depending on the type of light, the system will need to turn them on at different times so that when the camera shutter opens, each light is properly illuminated and has the right brightness.

Still another embodiment is a system that can adjust the lighting in the room to ensure that the lights have the proper color temperature for the image capture device. As is known, different types of lights have different color temperatures, i.e. brightness and color casts. Some lights have a blueish tint, while others give off a more yellow light. One aspect of the invention is to properly illuminate specific lights in the room so that the subject is illuminated with the same color temperature. That minimizes the auto white balance phase of the camera pipeline and makes the images appear more natural.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Referring now to FIG. 1, an exemplary image capture device with wireless lighting control will now be described in greater detail. As shown in FIG. 1, an image capture device 100 includes a display 110 which may show a preview of an image to be captured. The image to be captured may include a subject 140 and may also include a first floor lamp 120, a ceiling light 122, and a second floor lamp 124. On the display 110, the illumination devices, such the first floor lamp 120, may be numbered by an illumination device number 130. An illumination device number 130 may be beneficial in order to allow a user to manually control parameters of an illumination device.

Although the image capture device 100 shown is a digital camera, it will be understood by those skilled in the art that this is for purposes of illustration only and that the display 110 may be employed in a variety of image capture devices such as a video recorder, a web camera, a camera built into a portable or mobile computer, including but not limited to, a cellular telephone, smart phone, portable media player, personal digital assistant, a laptop, or a tablet computer. Image capture device 100 may be a digital camera, such as a digital video camera, a digital still image camera, or a combination of both. Image capture device 100 may be a stand-alone device, such as a stand-alone camera, or be integrated in another multi-purpose device, such as a wireless communication device. For example, image capture device 100 may be a cell phone or other wireless communication device.

Image capture device 100 may include a networking module configured to access one or more wireless networks, such as a wireless local area network (WLAN) or a wireless wide area network (WWAN). In some embodiments, the networking module may be configured to connect to proximity-based P2P wireless networks and/or ad-hoc wireless networks. One or more of these networks may make up a connected home. Such a connected home may use an integrated wireless network, such as the AllJoin proximity-based P2P system (Qualcomm Innovation Center, Inc), which can connect appliances and devices to an interface which can provide information regarding the appliances and devices to each other and/or a user. These one or more wireless networks may be used to provide image capture device 100 with information regarding one of more illumination devices in a location. For example, image capture device 100 may be configured to access a wireless network which contains information on one or more illumination devices within a home, office, or other location. Information on illumination devices may include the location, brightness, type of light bulb, and possible adjustment settings for an illumination device. For example, parameters of an illumination device may include the device's location, its color, the type of bulb, its brightness (for example, in lumens), and the extent to which its brightness may be adjusted, for example whether it can be adjusted to one of 100 brightness settings, or if the light can merely be turned on and off. The image capture device 100 may also be configured to control the one or more illumination devices. For example, the image capture device 100 may be configured to turn on or off the one or more illumination devices, and may be configured to adjust the brightness of illumination devices which may have adjustable brightness levels.

Image capture device 100 may be configured to recognize and identify illumination devices 120, 122, 124 which are positioned such that they may be in an image to be captured. For example, image capture device 100 may be configured to identify and number illumination devices which are displayed on the display 110. Image capture device 100 may also be configured to recognize and identify other nearby illumination devices, which may not be contained within an image, but whose light may potentially, at least partially, illuminate an image. For example, image capture device 100 may be configured to recognize the direction it is pointing, and to identify illumination devices which may be above, behind, or in front of the subject 140. Image capture device 100 may include an image sensor, and may be configured to recognize illumination devices contained within an image or illumination devices which may affect an image whether the illumination devices are currently turned on or turned off.

Figure 2A:
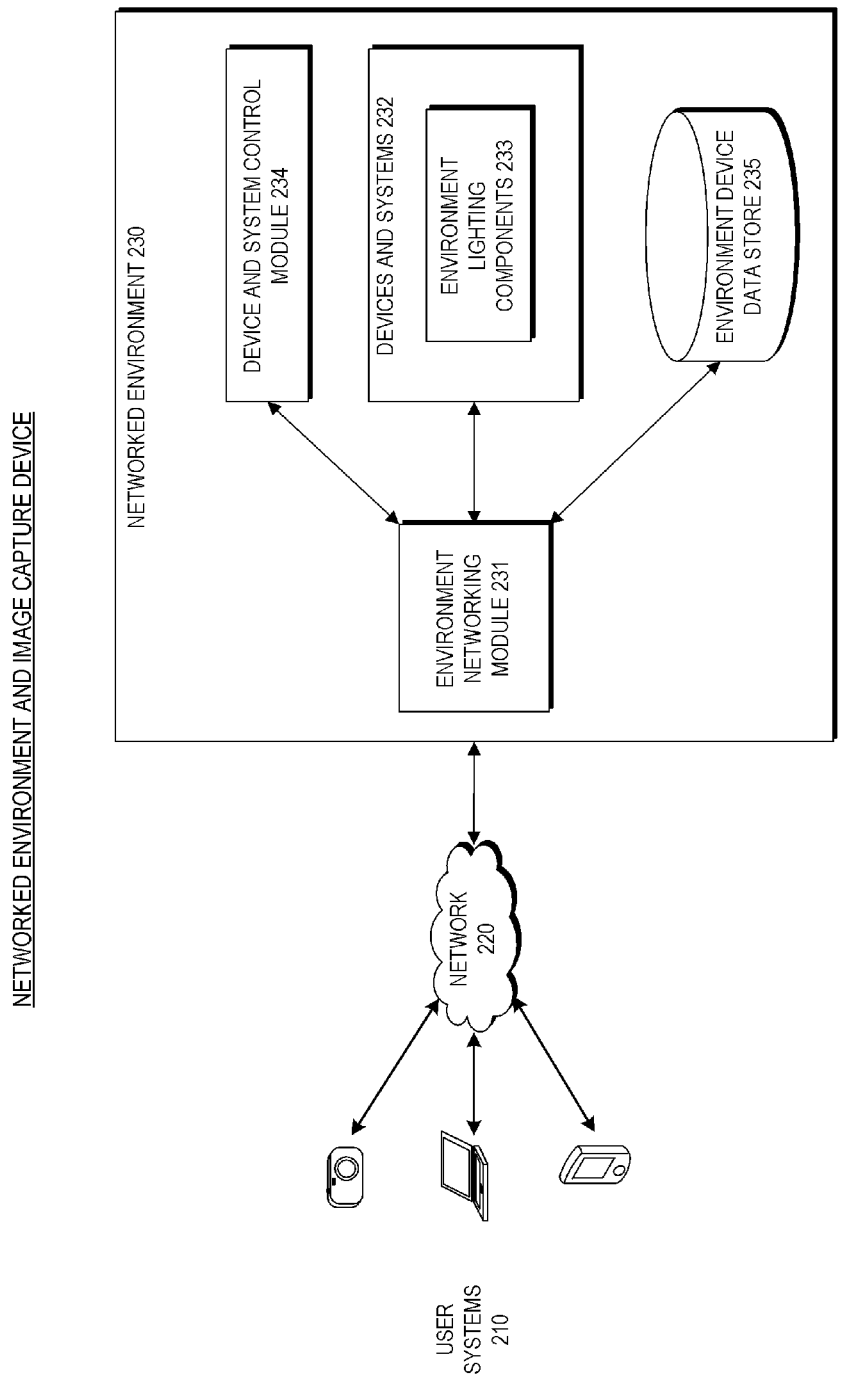
FIG. 2A illustrates an embodiment of an image capture system in a networked environment.

FIG. 2A illustrates an embodiment of an image capture system in a networked environment. In this embodiment, a number of user systems 210 may be connected to a network. These user systems 210 may include, for example, an image capture device, such as image capture device 100, personal computers, and handheld computing devices including phones, tablets, and other computing devices. Each of these user systems 210 may be configured to connect to a network 220. This network 220 may take any number of forms. For example, this network may be a WLAN network. This network may be centralized around a single router or hub device, or may be a decentralized network. This network may include a central server, or may use P2P networking technologies to enable devices to communicate with each other directly over the network.

The network 220 may be connected to a networked environment 230. In some embodiments, the networked environment 230 may represent a physical location, and may include one or more devices contained within the physical location. For example, the networked environment 230 may represent a connected home, in which a number of devices within the home are connected to the networked environment 230. The networked environment 230 may include an environment networking module 231. The environment networking module 231 may contain access restriction features, to ensure that only authorized users may access and control the devices and systems 232 contained within the networked environment 230. This environment networking module 231 may be connected to a device and systems control module 234. The device and systems control module 234 may allow control of a variety of devices and systems 232 which are a part of the networked environment 230. For example, the device and systems control module 234 may allow user systems 210 to connect to the network 220 and to control various devices and systems 232 contained within the networking environment 230.

The devices and systems 232 of the networked environment 230 may include any number of devices and systems 232 which may be present. The networked environment 230 may include a connected home environment. A connected home may enable centralized control of a number of systems within a home, including numerous electrical systems (e.g., light switches, televisions, radios, etc.), mechanical systems (e.g., windows, doors, door locks, etc.), communication systems (e.g., a security system, a local area network (LAN), etc.), and entertainment systems (e.g., televisions, home theater systems, etc.), and a connected home may enable centralized control of all of these systems.

The networked environment 230 may also include environment device data store 235. The environment device data store 235 may store data relating to the devices and systems 232 contained within the networked environment 230. For example, the environment device data store 235 may contain information about the environment lighting components 233 within the networked environment 230. This information may include, for example, the number of environment lighting components 233, their type of bulb, their brightness, their possible configurations and settings, and their locations. The information about the devices and systems 232 within the networked environment 230 may be available to user systems connected to the network 220 and authorized by the environment networking module 231. This information may be used in order to allow a user system 210, such as an image capture device 100, to adjust and control devices and systems 232, such as environment lighting components 233.

Figure 2B:
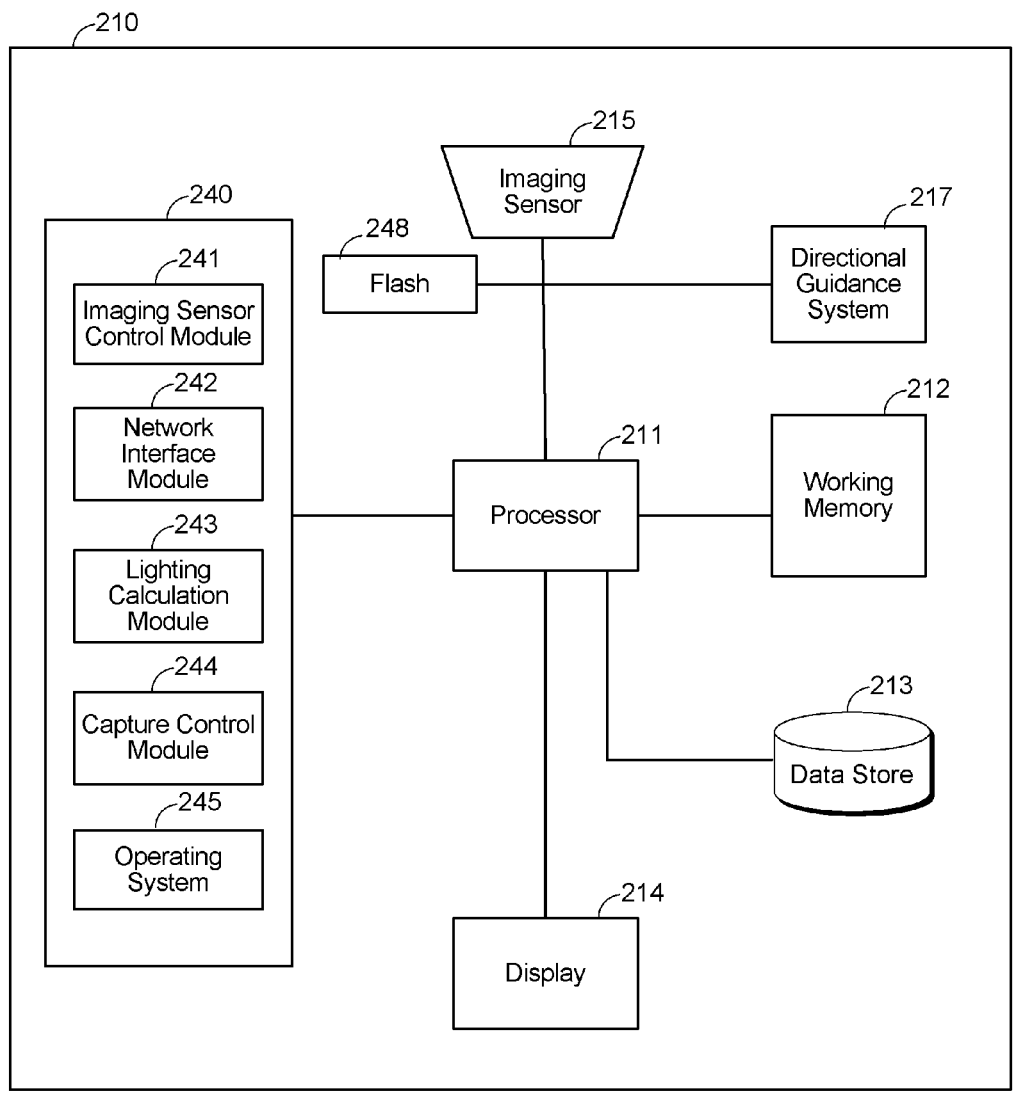
FIG. 2B is a block diagram illustrating an embodiment of an image capture device configured to wirelessly control environmental lighting.

FIG. 2B is a block diagram illustrating an embodiment of the image capture device 100 configured to wirelessly control environmental lighting. Image capture device 100 may include a processor 211. The processor 211 may be a specialized processor or a general-purpose processor. The processor 211 may comprise a single computer chip, or a number of computer chips and systems. The image capture device 205 may also contain an imaging sensor 215. The processor 211 may be configured to take image data or an image data stream from the imaging sensor 215 and to convert that image data into a useful format to store to a data store 213. The data store 213 may comprise any form of permanent or semi-permanent storage, such as a hard drive, flash memory, or another form of data storage. The processor 211 may also be configured to convert image data or an image data stream from the imaging sensor 215 into a form usable by a display 214. The processor 211 may user working memory 212 and data store 213 in performing its operations.

Image capture device 100 may recognize the direction it is pointing using various technologies. For example, image capture device 100 may contain a directional guidance system 217, which can include a GPS receiver, an accelerometer, a gyroscope, and/or a digital compass. The image capture device 100 may use one of more of these devices, alone or in concert with other technologies, to assist in determining what direction it is point, and which illumination devices may affect an image. Image capture device 100 may also recognize the direction is it pointing based, at least in part, upon information received from an image sensor and/or other sensors on the device. For example, image capture device 100 may be configured to analyze a preview image, such as that shown on display 110, and use this information, at least in part, to recognize and identify illumination devices which may be contained within the image or which may affect the image. Image capture device 100 may also recognize the distance to a subject 140, based at least in part upon the focus of an auto-focus lens on image capture device 100. The distance of the subject 140 may be used, at least in part, to determine which illumination devices, if any, may affect the lighting in an image.

The image capture device 100 may also include a memory 240 for storing executable software or firmware instructions and modules. Modules within the memory 240 may be executed by the processor 211 using the working memory 212, and the data store 213. The memory 240 may be configured to access image data or image data streams from the imaging sensor 215, and may be configured to output information to the data store 213 and/or a display 214. The display 214 may be a touch activated display wherein the user can control features of the software user interface using touch gestures.

Memory 240 may contain a number of individual software modules. In some embodiments, software module 240 may include an imaging sensor control module 241. This module may be configured to control and operate the imaging sensor. For example, the imaging sensor control module 241 may be configured to control lenses and other systems on the imaging sensor 215, in order to allow the imaging sensor 215 to function and to properly be able to obtain images.

Memory 240 may further contain a network interface module 242. This network interface module 242 may be configured to allow the image capture device 100 to connect to one or more networks, such as wireless P2P networks, WLANs, WWANs, and/or other networks. The network interface module 242 may be configured to transmit information to and from these networks, including information related to the control of illumination devices which may be connected to the one or more networks that the network interface module 242 may be connected to.

Memory 240 may further contain a lighting calculation module 243. The lighting calculation module 243 may be configured to receive image information from the imaging sensor, and to calculate optimal lighting settings for the image. The lighting calculation module 243 may base these calculations on a number of factors, such as user-configurable settings, information about illumination devices available on networks that the network interface module 242 is connected to, information about the location of the subject from the imaging sensor 215 and/or the imaging sensor control module 241, and other factors. The lighting calculation module 243 may use any of these factors, or others, to calculate optimal lighting settings for an image. The lighting calculation module 243 may also be configured to communicate through the network interface module 242 in order to control illumination devices on the network, in order to create optimal lighting settings for an image. In some embodiments, lighting calculation module 243 may also be configured to generate a preview image illustrating what an image may look like after lighting has been changed to its optimal settings.

Memory 240 may further include a capture control module 244. Capture control module 244 may be configured to control the capture of images from imaging sensor 215. Capture control module 244 may also be configured to coordinate the activities of imaging sensor control module 241 in focusing the lenses and other imaging sensor 215 functions, and lighting calculation module 243, in order to ensure than optimal lighting settings are calculated and created in time for an image to be captured. Capture control module 244 may be configured to support either single still image capture, multiple-image captures, or video capture. Capture control module 244 may be configured to use the processor 211 and working memory 212 to convert raw image data or raw image data streams from the imaging sensor 215 into a useful form, in order to store captures images or videos on the data store 213.

The capture control module 244 can also be configured to automatically or manually control the lighting features attached to the device 100. In some embodiments, image capture device 100 may allow a user to choose whether to manually or automatically control illumination devices. In a manual mode, a user may be able to control each light at once, to control groups of lights such as similar lights at once, or to control each light individually. The image capture device 100 may also contain the lighting calculation module 243 which may be configured to calculate optimal lighting settings. This module may be used in a manual mode to make suggestions to a user on lighting settings. A user may then use, modify, or discard these suggestions according to the user's preferences.

Image capture device 100 may be configured to have an automatic lighting mode. Image capture device 100 may include a calculation module using data generated from the lighting calculation module 243, and configured to calculate optimal lighting settings. In an automatic lighting mode, image capture device 100 may automatically control illumination devices which may affect an image according to calculated optimal lighting settings. For example, image capture device 100 may determine where a subject 140 is, and may determine which illumination devices may be above or near the subject. Image capture device 100 may include a control module configured to selectively turn on or off lights, or adjust the brightness of lights in order to create a more attractive image.

For example, image capture device 100 may turn on a "key light" on the subject, perhaps in front of the subject, and a "fill light" in order to fill in the shadows in the background. However, image capture device 100 may choose not to turn on all lights in the area, as this may create an unpleasant uniformity of light, or may not turn on the light directly above the subject, as this may create undesirable hard shadows on the subject. Image capture device 100 may have a plurality of settings for controlling the lighting in its automatic mode. For example, a user may indicate that he or she prefers more or less lighting of the subject, or of the background, or harder or softer lighting, and may adjust settings to accommodate this preference. The image capture device 100 may be configured to adjust the lights automatically, in real time, as the device is directed at various subjects, or may be configured to adjust lighting only when a shutter or other mechanism on the image capture device 100 is activated. In some embodiments, the image capture device 100 may capture video images rather than still images. In this embodiment, it may be beneficial to adjust lighting settings on a continuous or semi-continuous basis.

In some embodiments, the image capture device 100 may contain a built-in flash 248. This built-in flash 248 may be used in when there is insufficient illumination for a photograph, even after connecting to nearby illumination devices. For example, if there are no nearby illumination devices connected to the network, the image capture device 100 may use a built-in flash in the conventional manner. However, if there are nearby connected illumination devices and in sufficient number to create optimal lighting settings, the image capture device 100 may refrain from using its built-in flash to illuminate an image. This may enable the image capture device 100 to achieve substantially better battery life and lower power consumption, as a built-in flash may consume a large amount of power from a battery. The control of connected illumination devices may also allow the image capture device 100 to create significantly better photographs than the use of a conventional flash, as the illumination devices, when configured optimally, may create much more desirable lighting conditions for photography. The use of connected illumination devices rather than a flash may also reduce the number of times that a human subject may blink in a photograph, or reduce the incidence of the red-eye effect in a photograph.

The display 110 of image capture device 100 may be configured to show a preview image. This preview image may be an image of what the area looks with the current lighting, or may be a preview image of what the image would look like with certain adjustments to the light sources within the area. For example, the image capture device 100 may determine ideal lighting settings in an automated mode, and may preview what these lighting settings would look like on the display 110. This may allow a user to view what an image with optimized light settings would look like, without requiring that the illumination devices in the area be adjusted by the control module of the image capture device 100.

Memory 240 may further include an operating system 245. This operating system 245 may provide a number of features, such as providing a system on which other software modules may operate, and providing an interface to a user. Operating system 245 may be configured to provide an application programming interface (API) to other software modules, in order to enable other software modules to use the various physical components of the image capture device 100. For example, the operating system 245 may provide a number of commands and features by which other software modules may communicate with the imaging sensor 215, data store 213, display 214, and other components of the image capture device 100.

FIG. 3 illustrates an image capture environmental lighting control process according to one embodiment which may be carried out by the image capture device 100 of FIG. 1.

The process 300 begins at step 305 where the image capture device 100 establishes a connection to a connected home network. A connected home network may use any number of possible networking technologies. For example, a connected home network may use a P2P wireless networking technology. A connected home network may contain any number of devices, including lights and/or other illumination devices. One embodiment of a connected home network may include the network 220 and networked environment 230 of FIG. 2A.

The process 300 continues at step 310 where a user of an image capture device 100 initiates an image capture process in a room of the connected home. This may occur, for example, when a user pushes a button or control on the image capture device 100 to initiate taking a picture. When this occurs, the process 300 will continue to step 315, where the image capture device 100 will determine whether there are connected lights in the room. The image capture device 100 may be configured to determine its own location in a number of ways, as described above. Based upon this information, and information about nearby lights attached to the connected network, the image capture device 100 may determine whether there are nearby connected lights.

If the process 300 determines that there are no lights connected to the "connected home" network in the room, the process 300 will continue at step 320 where the image capture device 100 may perform the image capture process with built-in device flash, as no connected lights are available for illumination.

If the process 300 determines that there are connected lights in the room, the process 300 will continue to step 325, where it will obtain data representing light parameters and current settings. For example, connected lights in a room may be available on a network, and the network may also contain information regarding the connected lights. This information may include parameters of the connected lights, including their location, brightness, type of light bulb, current settings, and possible gradations of brightness. The image capture device 100 may obtain this data from each connected light within some proximity of the subject, such as subject 140 of FIG. 1.

The process 300 continues at step 330 where the image capture device 100 may present a user with an option to manually or automatically adjust lights. This option may be presented to a user each time he or she wishes to take a photo, may be presented to a user upon entering a connected home, or may be presented to a user once and the image capture device 100 may be configured to remember a user's selection.

If the user selects manual mode, the process 300 continues at step 335 where the image capture device 100 presents the user with an interface for adjusting parameters of the lights. For example, this interface may allow users to adjust the brightness of individual lights, turn lights on and off, and other parameters in order to create an optimal image. In some embodiments, the image capture device 100 may make these changes to the light settings in real time. In some embodiments, the image capture device 100 may display a preview image, previewing what the subject would look like with the selected image settings.

When a user has finished manually changing the settings of connected lights in the room, the process 300 continues at step 340 where the image capture device 100 adjusts the current light settings to match user input. The image capture device 100 may adjust current light settings using a network connection to the lights in the connected home, as detailed above.

If the user selects the automatic mode after step 330, the process 300 continues to step 345 where the image capture device 100 may calculate desired lighting parameters. The image capture device 100 may include a lighting calculation module 243 as in FIG. 2B, which may be configured to calculate the optimal lighting settings. This module may be used to calculate desired lighting parameters, based at least in part on the location of the subject, ambient light available, the angle of the image capture device 100, the connected lights in the room, user-selected preferences, or other factors.

The process 300 continues to step 350, where the image capture device 100 may adjust the current light settings to match desired lighting parameters. The image capture device 100 may adjust current light settings using a network connection to the lights in the connected home, as detailed above.

Finally, the process 300 continues, after either step 340 or step 350, to step 355 and captures an image. This image may be stored on a local storage, such as the data store 213 in FIG. 2B, or may be stored or transmitted to another device over a network.

Figure 4:
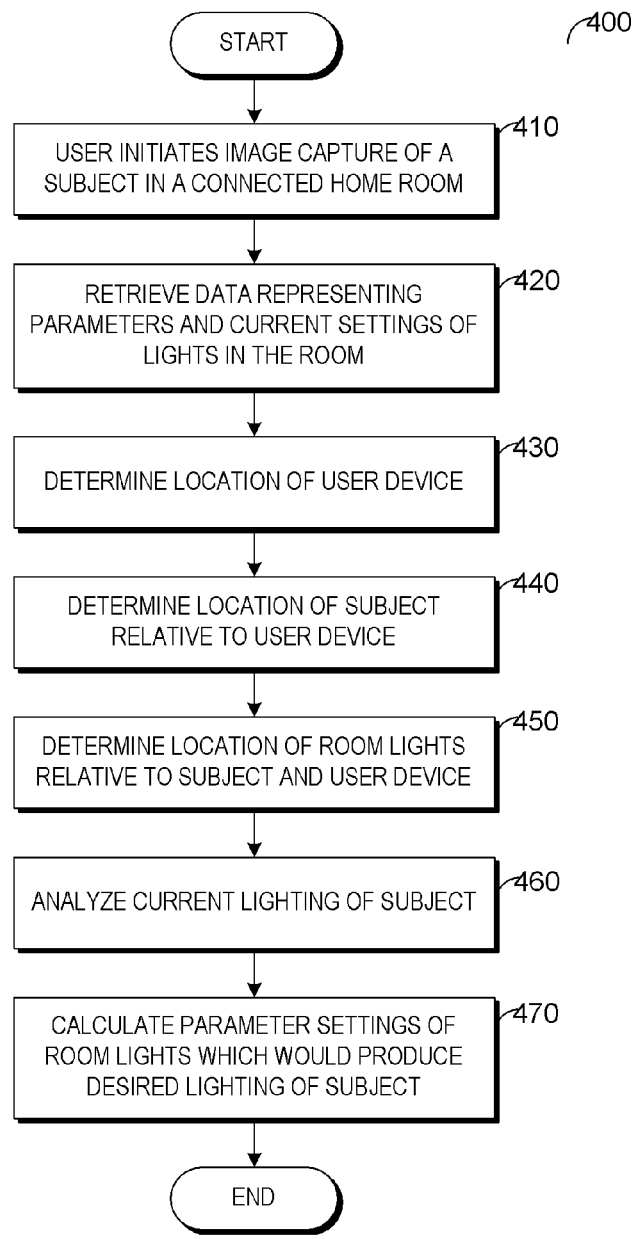
FIG. 4 illustrates a lighting parameter calculation process according to one embodiment.

FIG. 4 illustrates a lighting parameter calculation process according to one embodiment.

The process 400 begins at step 410 where the user initiates an image capture of a subject in a connected home room. For example, the user may be using a image capture device 100 to take a photograph of a subject 140, as in FIG. 1.

The process 400 continues at step 420 where the image capture device 100 retrieves data representing parameters and current settings of lights in the room. These parameters may include the number of lights in a room, their locations, brightness, type of bulb, or other parameters. These parameters may be retrieved directly from the connected lights in the room, using a P2P networking.

The process 400 continues at step 430 to determine the location of the user device. The user device, which may be an image capture device 100, may be located using a number of methods as detailed above, including by using an imaging sensor on the image capture device 100.

The process 400 continues at step 440 by determining the location of the subject relative to the user device. In some embodiments, the location of the subject may be determined based at least in part on the auto-focus lens settings of the user device. For example, if the lens is currently in macro mode, the subject may be nearby, while if the lens is in an infinite range focus mode, the subject may be ten or more feet away.

The process 400 continues at step 450 by determining the location of room lights relative to the subject and to the user device. This determination may be based, at least in part, upon the location of the lights, the location of the user device, and the distance between the user device and the subject.

The process 400 continues at step 460 by analyzing the current lighting of the subject. This analysis may be based, at least in part, by analyzing data received from imaging sensors on the image capture device 100. The data received from imaging sensors may be analyze to determine whether the subject and/or the background is too bright or washed out, too dark, or contains hard shadows which may be undesirable. The data received from imaging sensors may also be analyzed to determine what the subject is. For example, it may be preferable to have different lighting settings for a photograph of a person as opposed to a photograph of an inanimate object.

Finally, the process 400 concludes at step 470 by calculating the parameter settings of room lights which would produce the desired lighting of the subject. This calculation may be based, at least in part, on the current lighting of the subject, the location of the subject, the location of room lights, and the location of the user device.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An image capture device comprising:
    an image sensor configured to capture an image of a target subject;
    a processor configured to perform a method comprising:
        detecting at least one illumination device proximate to the target subject, wherein the at least one illumination device is part of a networked environment;
        determining whether the at least one illumination device is proximate to the target subject based at least on a location of the at least one illumination device;
        calculating optimal lighting settings based at least in part on the location of the at least one illumination device; and
        adjusting the at least one illumination device according to the optimal lighting settings.

2. The image capture device of claim 1, wherein at least one parameter is associated with the at least one illumination device.

3. The image capture device of claim 2, wherein the at least one parameter is one of brightness and type of light bulb.

4. The image capture device of claim 1, wherein the networked environment comprises a wireless network connection to a proximity-based peer-to-peer network.

5. The image capture device of claim 1, wherein the networked environment is a connected home.

6. A method of image capture comprising:
    receiving preview image data of a target subject on an image capture device;
    receiving data representing at least one parameter of at least one light source in a local environment of the target subject, the at least one parameter including an indication of a location of the at least one light source;
    calculating optimal lighting parameters for the target subject based at least in part on the location of the at least one light source;
    adjusting the at least one parameter of the at least one light source according to the optimal lighting parameters; and
    capturing the image.

7. The method of claim 6, wherein calculating optimal lighting parameters comprises:
    presenting the at least one parameter of the at least one light source to a user on a user interface of the image capture device; and receiving user input regarding a setting for the at least one parameter.

8. The method of claim 6, wherein calculating optimal lighting parameters is carried out automatically by the image capture device.

9. The method of claim 6, wherein calculating optimal lighting parameters comprises determining a location of the target subject.

10. The method of claim 9, wherein determining a location of the target subject comprises using an auto-focus lens position of the image capture device to calculate an approximate distance of the target subject from the image capture device.

11. The method of claim 9, wherein determining a location of the target subject comprises updating the location as the target subject moves.

12. The method of claim 9, wherein calculating optimal lighting parameters further comprises comparing the location of the at least one light source to a location of the target subject.

13. The method of claim 6, wherein adjusting the at least one parameter of the at least one light source is carried out via wireless communication over the network.

14. The method of claim 13, wherein the wireless communication is between the image capture device and the at least one light source.

15. The method of claim 13, wherein the wireless communication is between the image capture device and a control module of a connected home, wherein the control module communicates with the at least one light source.

16. A system for image capture comprising:
 means for providing a network of devices within an environment;
 means for receiving data representing at least one parameter of at least one light source within the environment, the at least one parameter including an indication of a location of the at least one light source;
 means for calculating optimal lighting parameters of a target subject within the environment based at least in part on the location of the at least one light source;
 means for adjusting the at least one parameter of the at least one light source to match the optimal lighting parameters; and
 means for capturing an image of the target subject.

17. The system of claim 16, wherein the means for calculating optimal lighting parameters comprises a user interface for displaying the at least one parameter to a user, wherein the user interface is configured to allow the user to control a current setting of the at least one parameter.

18. The system of claim 16, wherein the means for calculating optimal lighting parameters comprises a lighting settings calculation module of an image capture device.

19. The system of claim 18, wherein the lighting settings calculation module calculates the optimal lighting parameters based at least in part on a location of the target subject and the at least one parameter of the at least one light source.

20. A non-transitory computer-readable medium comprising code that, when executed, causes a processor to perform the method of:
 connecting an imaging device to a network;
 retrieving data representing at least one parameter of at least one light source connected to the network, wherein the at least one light source illuminates a target subject, the at least one parameter including an indication of a location of the at least one light source;
 calculating optimal lighting parameters of the target subject based at least in part on the location of the at least one light source;
 adjusting the at least one parameter of the at least one light source according to the optimal lighting parameters; and
 capturing the image.

21. The non-transitory computer-readable medium of claim 20, wherein calculating optimal lighting parameters is based at least in part on a location of the target subject and the at least one parameter of the at least one light source.

22. The non-transitory computer-readable medium of claim 20, wherein calculating optimal lighting parameters comprises determining a location of the target subject.

23. The non-transitory computer-readable medium of claim 22, wherein determining a location of the target subject comprises using an auto-focus lens position of the image capture device to calculate an approximate distance of the target subject from the image capture device.

24. The non-transitory computer-readable medium of claim 22, wherein determining a location of the target subject comprises updating the location as the target subject moves.

25. The non-transitory computer-readable medium of claim 20, wherein adjusting the at least one parameter of the at least one light source is carried out via wireless communication over the network.

* * * * *